(12) United States Patent  
Kasuga et al.

(10) Patent No.: US 6,663,285 B2
(45) Date of Patent: Dec. 16, 2003

(54) LINEAR GUIDE BEARING APPARATUS (75) Inventors: Shinichi Kasuga, Gunma (JP); Ryoichi Sato, Gunma (JP); Hiroki Yamaguchi, Gunma (JP)

(73) Assignee: NSK Ltd., Tokyo (JP)

( * ) Notice: Subject to any disclaimer, the term of this patent is extended or adjusted under 35 U.S.C. 154(b) by 44 days.

(21) Appl. No.: 09/756,182

(22) Filed: Jan. 9, 2001

(65) Prior Publication Data

US 2001/0008568 A1 Jul. 19, 2001

(30) Foreign Application Priority Data

Jan. 13, 2000 (JP) ...................................... P.2000-004310

(51) Int. Cl.$^7$ .............................................. F16C 29/06
(52) U.S. Cl. ........................................... 384/45; 384/51
(58) Field of Search ............................... 384/43, 44, 45, 384/49, 51; 74/424.86, 424.87

(56) References Cited

U.S. PATENT DOCUMENTS 5,597,243 A * 1/1997 Kaiser et al. ................ 384/551
5,927,858 A * 7/1999 Agari .......................... 384/45
6,347,558 B1 * 2/2002 Miyaguchi et al. ........... 384/43

FOREIGN PATENT DOCUMENTS

| JP | 5-126149 | * 5/1993 | ........... F16C/29/06 |
| JP | 6-173946 | * 6/1994 | ........... F16C/29/06 |
| JP | 2000-304046 | 10/2000 | ........... F16C/29/06 |

* cited by examiner

Primary Examiner—William C Joyce
Assistant Examiner—Timothy McAnulty
(74) Attorney, Agent, or Firm—Sughrue Mion, PLLC (57) ABSTRACT In a linear guide bearing apparatus wherein a separator is interposed between adjacent balls K and K moving following a curved circulating path 8, and the ball K contacts concave faces W of the separator T at both ends in an axial line direction and at the same time the ball K rolls as contacting a guide face 8a of an outside guiding member 5 and a guide face 8b of an inside guiding member 9, the separator has an outer diameter larger than a maximum outer diameter L$\phi$ under a condition where the ball rolls as simultaneously contacting both curved faces 8a, 8b of the inside and the outside of the curved circulating path 8, and the radius of curvature of the guiding face 8b in the curved circulating path 8 is reduced to a size not contacting the separator T.

2 Claims, 6 Drawing Sheets

LINEAR GUIDE BEARING APPARATUS

BACKGROUND OF THE INVENTION

1. Field of the Invention

The invention relates to a linear guide bearing apparatus making use of rolling of balls, and in particular to an improvement of a linear guide bearing apparatus interposing separators between the balls.

2. Description of the Related Art

Figure 7:
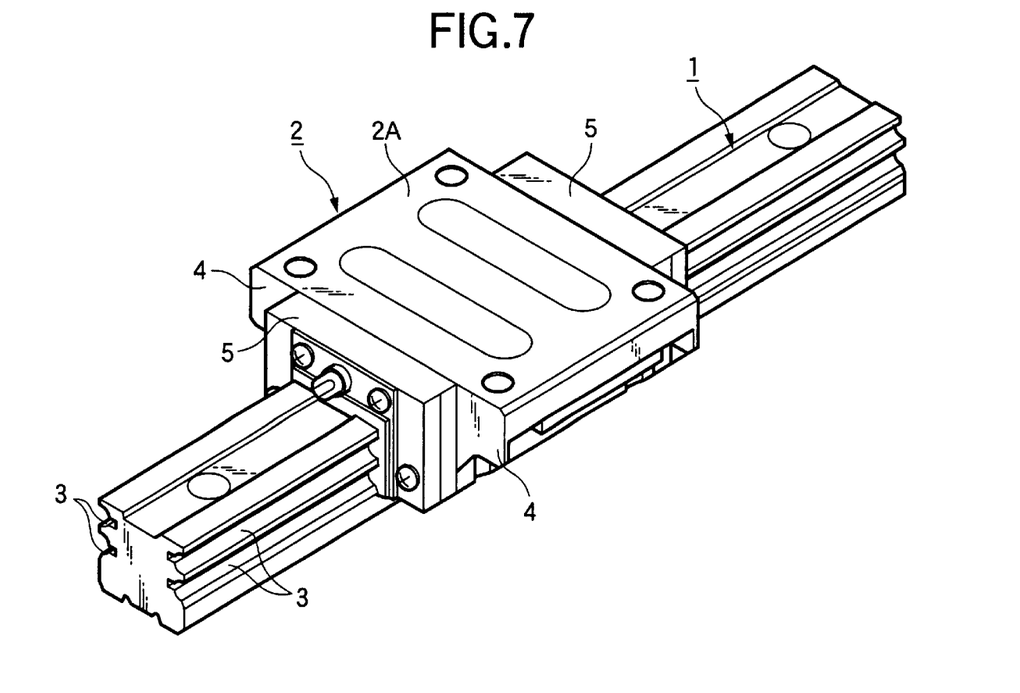
FIG. 7 is a perspective view of an outer appearance showing one embodiment of the linear guide bearing apparatus of the related art.

As a linear guide bearing apparatus of the related art making use of rolling of balls, for example, there is, as shown in FIG. 7, a linear guide apparatus which is furnished with a guide rail 1 elongated in an axial direction and a slider 2 movably crossing thereover. The guide rail 1 is defined at both sides with ball rolling grooves 3 respectively in the axial direction. On the other hand, as shown in FIG. 8 being a cross sectional view, a main body 2A of a slider 2 is defined with ball rolling grooves 6 in opposition to the ball rolling grooves 3 at the inside of both wings 4.

Both opposite ball rolling grooves 3, 6 form a loading ball rolling path A, and balls K of many steel balls roll while supporting load, so that the slider 2 move on the guide rail 1 in the axial direction. Following this moving, the ball K intervened between the guide rail 1 and the slider 2 moves to an end part of the main body 2A of the slider 2, and in order to continuously move the slider in the axial direction, the balls K must be unlimitedly circulated.

Therefore, a linear penetrating hole 7 is formed as a ball returning path axially penetrating in the wings 4 of the slider main body 2A, and at the same time, end caps 5 are equipped at both front and rear ends of the slider main body 2A, where a ball circulating path 8 is formed which is curved in half toroid for communicating the loading ball rolling path A of both ball rolling grooves 3 and 6 with the ball returning path 7, thereby to compose an endless ball circulating path. The ball circulating path 8 is composed of an outside guiding face 8a and an inside guiding face 8b. The outside guiding face 8a is a semi arc groove formed in the inside end of the end cap 5 being an outside guiding member. The inside guiding face 8b is an outer circumference of a half column shaped inside guiding member 9 (also called as return guide) secured to the end face of the slider main body 2A.

Figure 8:
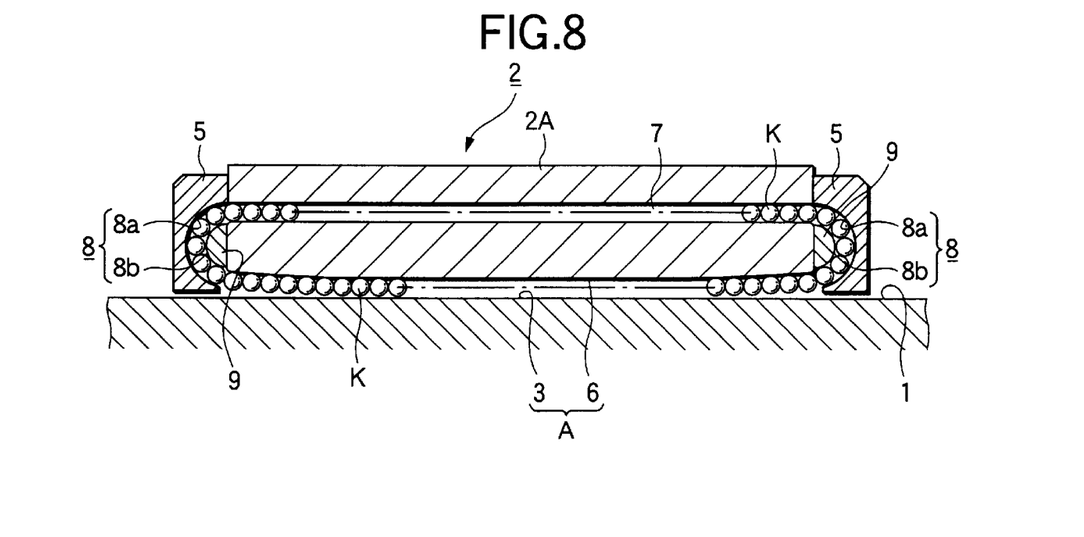
FIG. 8 is a cross sectional view in the axial direction including the curved raceway part of the linear guide bearing apparatus of FIG. 7.
Figure 9:
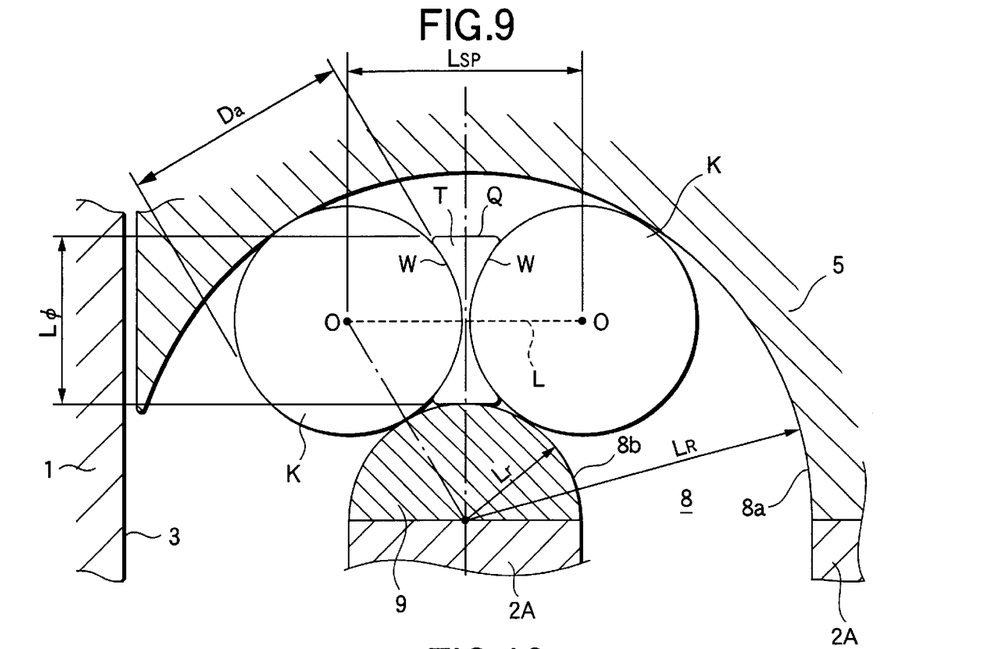
FIG. 9 is a cross sectional view of the curved raceway part showing the maximum outer diameter of the separator under the condition of "no space and no playing"

Although not shown in FIG. 8, there is also a case that the separator T (also called as retaining piece), as shown in FIG. 9, interposed between the adjacent balls K and K in the unlimited circulating path.

Applicant invented linear guide apparatus of improving operating performance by specifying sizes and shapes of the separator T (Japanese Patent Application No. Hei.11-166900). This is, as shown in FIG. 9, that the separator T is substantially cylindrical at an outer circumference Q and has concave parts W at both sides for contacting the balls K. Under a condition that the balls K are contacted with the concave faces W, an axial line L of the separator coincide with a straight line combining central points O and O of the adjacent balls K and K, and the radius of curvature of the concave face part W contacting with the ball K is almost equal to the radius of the ball K.

The separator T has effects of suppressing zigzag phenomena of the ball to heighten the operating performance and suppressing noises to heighten noise characteristics. The larger the holding margin of the ball, that is, the larger the outer diameter $L\phi$ of the separator T, the larger the effects, and a maximum outer diameter size is regulated to be sizes interfering with the inside guiding member 9. FIG. 9 shows a condition where the ball K rolls while contacting with both of the outside guiding face 8a and the inside guiding face 8b of the ball circulating path 8, namely, a condition of "no space and no playing". The maximum value $L\phi$ of the outside dimension of the separator T can be expressed the following formula (1) based on a theorem of three dimensional square.

$$L\phi = 2\{(L_R - Da/2)^2 - (L_{SP}/2)^2\}^{1/2} - 2Lr \qquad (1)$$

herein, $L\phi$: the maximum outer diameter when the separator T makes no playing Da: the ball diameter $L_{SP}$: span between balls $L_R$: the radius of the outside guiding face 8a Lr: the radius of the inside guiding face 8b.

Under the condition of "no space and no playing" of the balls K with respect to the inner and outer guiding faces 8a, 8b of the ball circulating path 8, since the balls do not always roll smoothly, taking the allowable dimensional precision in production into consideration, it is general to prepare playing of about 10% of the ball diameter between the ball K and the ball rolling circulating path 8, irrespective of presence or absence of the separator T.

Figure 10:
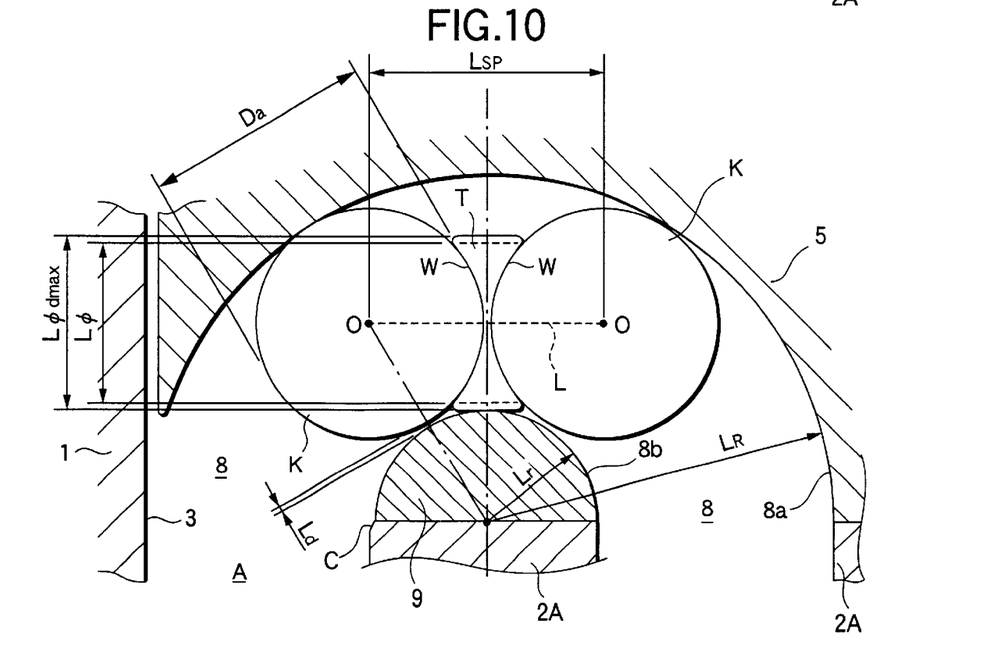
FIG. 10 is a cross sectional view of the curved raceway part showing the maximum outer diameter of the separator with spaces.

FIG. 10 shows a case of a general ball circulating path 8 providing somewhat playing in rolling of the ball K, and the maximum outer diameter size $L\phi$max of the separator T at this time is expressed by the following formula (2), which can be made larger than the maximum outer diameter $L\phi$ without preparing the playing.

$$L\phi\text{max} = 2\{(L_R - Da/2)^2 - (L_{SP}/2)^2\}^{1/2} - 2(L_R - Da - Ld) \qquad (2)$$

herein, $L\phi$max: the maximum outer diameter of the separator T (a little playing)

$L\phi$: the maximum outer diameter when the separator T makes no playing

Da: the ball diameter $L_{SP}$: span between balls $L_R$: the radius of the outside guiding face 8a Lr: the radius of the inside guiding face 8b Ld: the amount of "playing"

However, the separator T having the maximum outer diameter size $L\phi$max under the condition of "with playing" (FIG. 10) of the linear guide bearing apparatus shown in JP-A-11-166900 is involved with the problem that the outer diameter of the separator T is made as large as possible for heightening the ball holding effect by enlarging a holding margin, but the interference with the slider main body 2A is created so that it is difficult to provide an improving effect of sufficient operating performance. In short, as shown in FIG. 10, it is preferable that a little playing is present between the ball K and the inside guiding member 9 in the ball circulating path 8, but in contrast, the ball K must not have the playing in the loading ball rolling path A. Thus, a corner portion C which is present at an edge in the loading ball rolling path A of the slider main body 2A equipped with the inside guiding member 9 (return guide) in the ball circulating path 8, cannot but inevitably be a little protruded toward the loading ball rolling path A. This protruded corner portion C interferes with the separator T.

The above mentioned patent application showes that it is effective to regulate the maximum outer diameter $L\phi$max of the separator T within the range of 60 to 80% of the ball diameter Da. But, when using the separator T as large as possible which is an outer diameter of about 70 to 80% near to the upper limit, in order to avoid the interference, the inside guiding face 8b of the inside guiding member 9 is made a composite curve comprising a plurality of curves different in centers and radii of curvature, not a simple semicircle, so that the inside guiding member 9 is remarkably complicated in shape, inviting cost-up.

Inventors noticed unsolved problems of the related art, made studies and found that even if the playing becomes larger to a certain degree between the ball and the inside guiding member in the ball circulating path, an effect for heightening the ball holding function by enlarging the outer diameter of the separator T exceeds an influence by the playing, and as a result, the operating performance of the linear guiding apparatus is improved, and have realized this invention.

SUMMARY OF THE INVENTION

Accordingly, it is an object of the invention to provide a more economical linear guide bearing apparatus where, using a separator T of an outer diameter as large as possible, the separator can be prevented from interference with a ball circulating path or a slider main body, enabling to heighten operating performance, noise characteristics and durability.

For accomplishing the above mentioned object, a first aspect of the invention is a linear guide bearing apparatus, wherein guiding balls have parts which move following a curved circulating path regulated by guiding members, a substantially column or cylindrical separator is interposed between adjacent balls in such a manner that a straight line combining center points of the adjacent balls is parallel to coincides to an axial line of the separator, and concave faces in both ends of the separator in the axial direction respectively contact spherical surfaces of the adjacent balls, characterized in that the separator simultaneously contacts both curved faces of an inside and outside in the curved circulating path while the separator has a size of an outer diameter more than a maximum size of an outer diameter under a condition where the ball rolls, a radius of curvature of an inside curve in the curved circulating path is reduced to a size not contacting the separator, and a radius of curvature of an outside curve in the curved circulating path is enlarged to a size not contacting the inside curve and the separator.

A second aspect of the invention is a linear guide bearing apparatus, wherein guiding balls have parts which move following a curved circulating path regulated by guiding members, a separator is interposed between adjacent balls in such a manner that a straight line combining center points of the adjacent balls coincides to an axial line of the separator, and concave faces in both ends of the separator in the axial direction respectively contact spherical surfaces of the adjacent balls, characterized in that the separator simultaneously contacts both curved faces of an inside and outside of the curved circulating path while the separator has a size of an outer diameter more than a maximum size of an outer diameter under a condition where the ball rolls, and a chamfering for preventing interference with the separator is processed at a corner portion of an edge in the ball rolling circulating path of a main body of the linear guide bearing apparatus furnished with an inside member forming an inside curve in the curve circulating path.

A third aspect of the invention is a linear guide bearing apparatus, wherein guiding balls have parts which move following a curved circulating path regulated by guiding members, a separator is interposed between adjacent balls in such a manner that a straight line combining center points of the adjacent balls coincides to an axial line of the separator, and concave faces in both ends of the separator in the axial direction respectively contact spherical surfaces of the adjacent balls, characterized in that the separator simultaneously contacts both curved faces of an inside and outside in the curved circulating path while the separator has a size of an outer diameter more than a maximum size of an outer diameter under a condition where the ball rolls, and has an outer diameter of less than 95% of the ball diameter.

A fourth aspect of the invention is a linear guide bearing apparatus, wherein guiding balls have parts which move following a curved circulating path regulated by guiding members, a separator is interposed between adjacent balls in such a manner that a straight line combining center points of the adjacent balls coincides to an axial line of the separator, and concave faces in both ends of the separator in the axial direction respectively contact spherical surfaces of the adjacent balls, characterized in that the separator simultaneously contacts both curved faces of an inside and outside of the curved circulating path while the separator has a size of an outer diameter more than a maximum size of an outer diameter under a condition where the ball rolls, and concave parts are provided at outer circumferences of the outer diameter of the separator for preventing interference with the inside curve in the curve circulating path.

A fifth aspect of the invention is a linear guide bearing apparatus, wherein guiding balls have parts which move following a curved circulating path regulated by guiding members, a separator is interposed between adjacent balls in such a manner that a straight line combining center points of the adjacent balls coincides to an axial line of the separator, and concave faces in both ends of the separator in the axial direction respectively contact spherical surfaces of the adjacent balls, characterized in that the separator simultaneously contacts both curved faces of an inside and outside in the curved circulating path while the separator has a size of an outer diameter more than a maximum size of an outer diameter under a condition where the ball rolls, and the outer diameter face of the separator and the inside curve in the curved circulating path slidingly contact.

A sixth aspect of the invention is a linear guide bearing apparatus, wherein guiding balls have parts which move following a curved circulating path regulated by guiding members, a separator is interposed between adjacent balls in such a manner that a straight line combining center points of the adjacent balls coincides to an axial line of the separator, and concave faces in both ends of the separator in the axial direction respectively contact spherical surfaces of the adjacent balls, characterized in that the separator simultaneously contacts both curved faces of an inside and outside of the curved circulating path while the separator has a size of an outer diameter more than a maximum size of an outer diameter under a condition where the ball rolls, and the separator is provided with a projection on the outer diameter face, and the projection and the inside curve in the curved circulating path slidingly contact.

DETAILED DESCRIPTION OF THE PREFERRED EMBODIMENTS

Explanation will be made to the invention by way of the drawings. The same reference numeral and signs will be given to corresponding parts to those of the related art for preventing repetition of explanation.

Figure 1A:
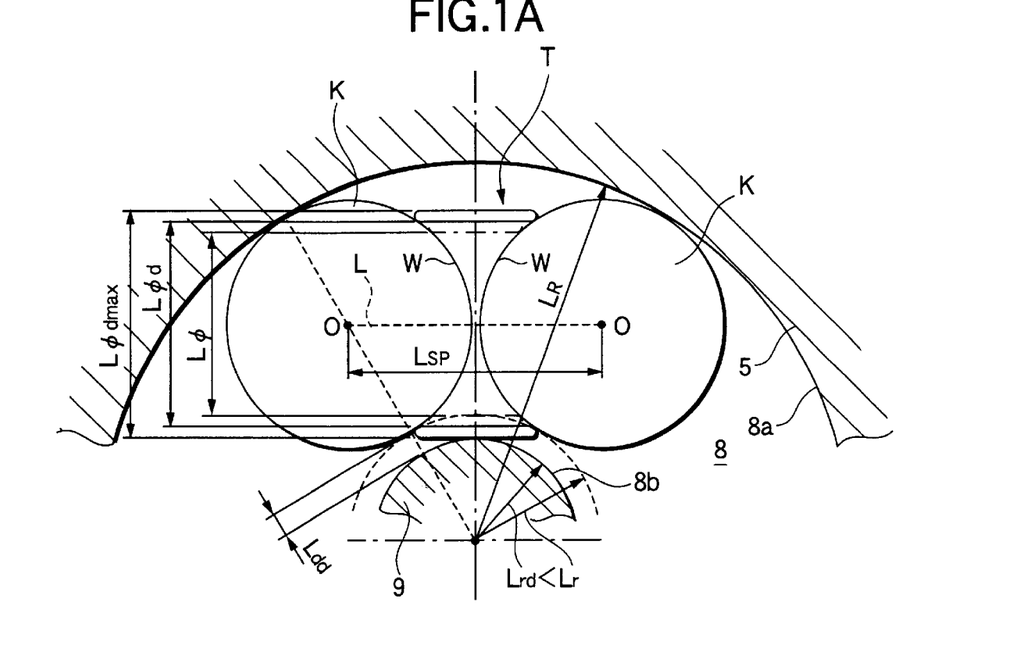
FIGS. 1A and 1B are cross sectional views of curved raceway parts showing a first embodiment of the linear guide bearing apparatus of the invention.

FIG. 1 shows a first embodiment of the linear guide bearing apparatus of the invention, and is a cross sectional view of a part of a curved ball circulating path 8 composed of an outside guiding member 5 called as an end cap and an inside guiding member 9 called as a return guide.

In this embodiment, separators T having a solid cylinder shape are interposed between adjacent balls K in such a manner that an axial line L of the separator T coincides to a straight line combining center points O of the adjacent balls K. The separator T has concave faces W in both ends in the axial direction, radius of curvature of which is substantially the same radius of curvature of the ball K. But, it is sufficient that the concave face of the separator T contacts with the spherical face of the ball K at least in a vicinity of an outer circumferential parts thereof. A main body of the separator T is not necessarily shaped in solid cylinder (column), but may be a hollow cylinder or spherical. What is requisite is that the separator T is easy to catch the ball K and a holding margin may be enlarged. From the above viewpoint, it is more advantageous that the separator T is shaped in solid cylinder than in sphere in the outer circumference, and that the separator has a shape where the concave face and the ball K contact at more outer circumferential parts of the concave faces W at both ends.

In the ball circulating path 8 where the ball K rotates under no load, as mentioned above, generally the ball is provided with a certain clearance for smooth circulation of the ball and allowable dimensional precision, but a play is caused thereby in the ball rolling to spoil the operating performance and noise characteristics. With respect to minus effects that the ball playing becomes large in the ball circulating path, the invention compensates it by increasing the outer diameter of the separator T so that a larger effect is brought about, thereby to heighten a ball holding function, consequently to improve the operating performance of the linear guide apparatus.

As one of means for increasing the outer diameter of the separator T as large as possible without interfering with the return guide 9 being the inside guide member, the present embodiment reduces the radius of curvature Lrd of the return guide 9 than the radius of curvature Lr in case of no playing (shown with a dotted line in FIG. 1). The outer diameter L φd of the separator T can be made thereby larger than the outer diameter Lφ at the time of no playing shown with a broken line and can be expanded until a maximum outer diameter Lφdmax. By increasing the outer diameter of the separator T, it is possible to bring about a plus effect exceeding the minus effect of increasing the playing amount Ldd caused by decreasing the radius of curvature of the return guide 9.

Figure 1B:
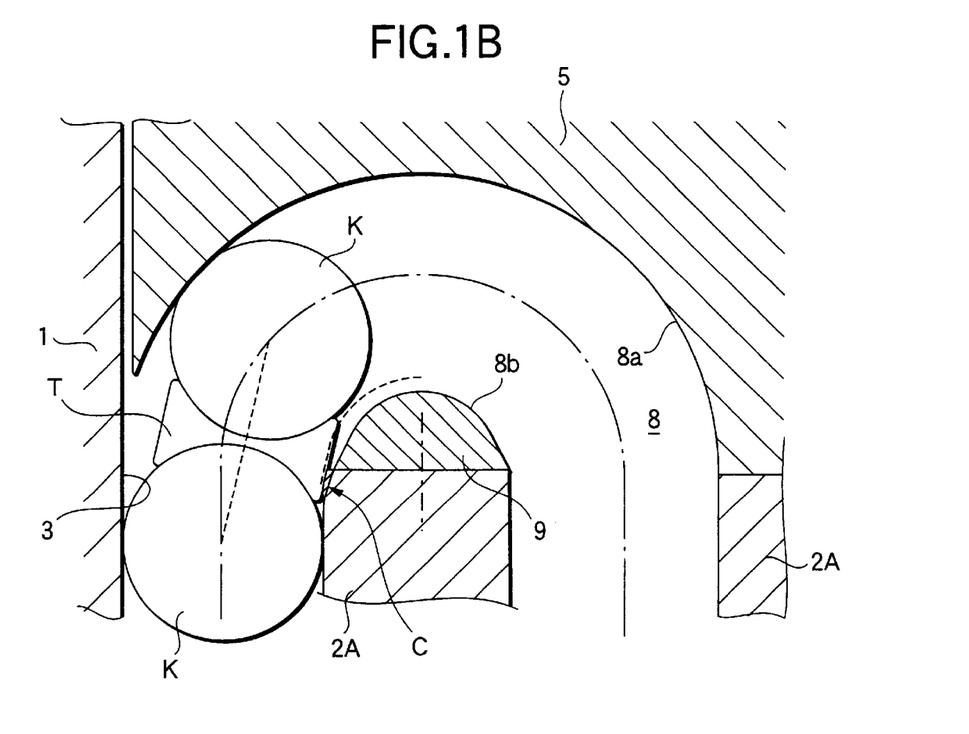

Although the interference with the separator T can be avoided by reducing the radius Lr of curvature of the return guide 9, depending on sizes in a space between the outer diameter Lφd of the separator T and the radius Lrd of curvature of the return guide 9, the separator T interferes with a corner portion C at the edge of a slider main body 2A furnished with the return guide 9 as shown in FIG. 1B and protruding toward A side of the rolling path of the loading ball. For stopping this interference, it is sufficient to chamfer the corner portion C at the end of the slider main body 2A. Thus, it is possible to circulate a still larger separator T by use of a return guide of simple shape as arc, thereby enabling to heighten the functioning performance at lower cost.

The relation between the playing amount Ldd and the outer diameter Lφd of the separator T is expressed by the following formula (3)

$$Ldd=[(L_{SP}/2)^2+\{(L\phi d/2)+Lrd\}^2]^{1/2}-Lrd-Da/2 \qquad (3)$$

herein,

Ldd: the playing amount

Lφd: the outer diameter of the separator

Da: the ball diameter

L$_{SP}$: span between the ball

Lrd: the radius of the reduced inside guiding face 8b

It is seen from this formula that the larger the outer diameter Lφd of the separator T, the larger the playing amount Ldd. From the results of the actual measurements, it was found that the ball holding effect by the separator T surpassed the minus effect by the playing until a playing amount of a certain degree, and an improvement of the operating performance was recognized, but if the playing amount was too much, a zigzag phenomenon of the ball could not be controlled, and consequently the improvement of the operating performance was not acknowledged.

The allowable maximum outer diameter Lφ dmax of the separator T is regulated by interference with the particular inside guiding member 9 (return guide) among the guiding members. That is, since the separator T is determined such that the axial line of the separator T coincides with the straight line L combining the central points O of the adjacent balls K, if the outer diameter size Lφd of the separator T is made large, the outer circumferential part comes nearer to the inside guiding member 9, and if making too large, both interfere each other. When the separator T interferes with the inside guiding member 9, the interference causes to make noises, lower the operating performance or endurance. Accordingly, the maximum allowable value Lφdmax of the outside dimension of the separator T is a value of contacting the inside guiding member 9.

Figure 2A:
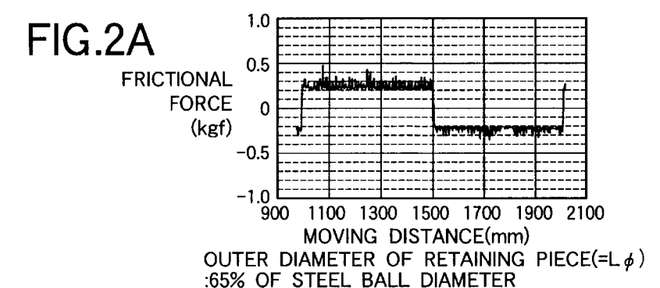
FIGS. 2A to 2E are explanatory views of variations in frictional force for evaluating the operating performance of the separator per each of the outside dimensions with respect to the ball diameter.
Figure 2B:
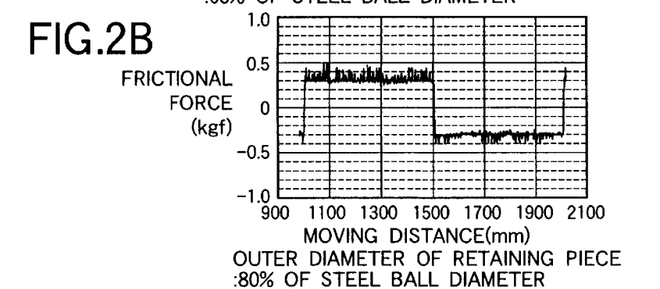
Figure 2C:
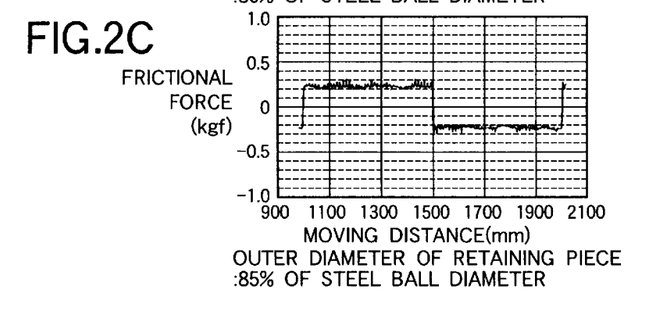
Figure 2D:
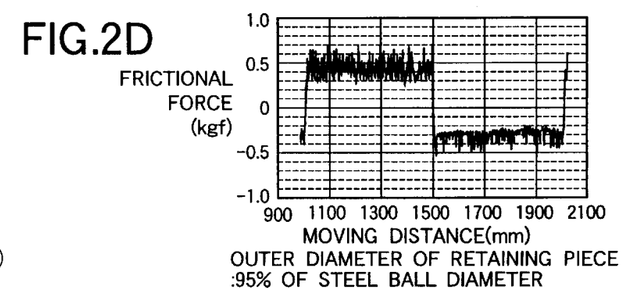
Figure 2E:
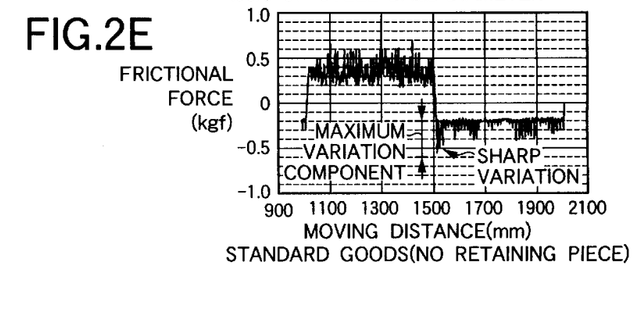
Figure 3:
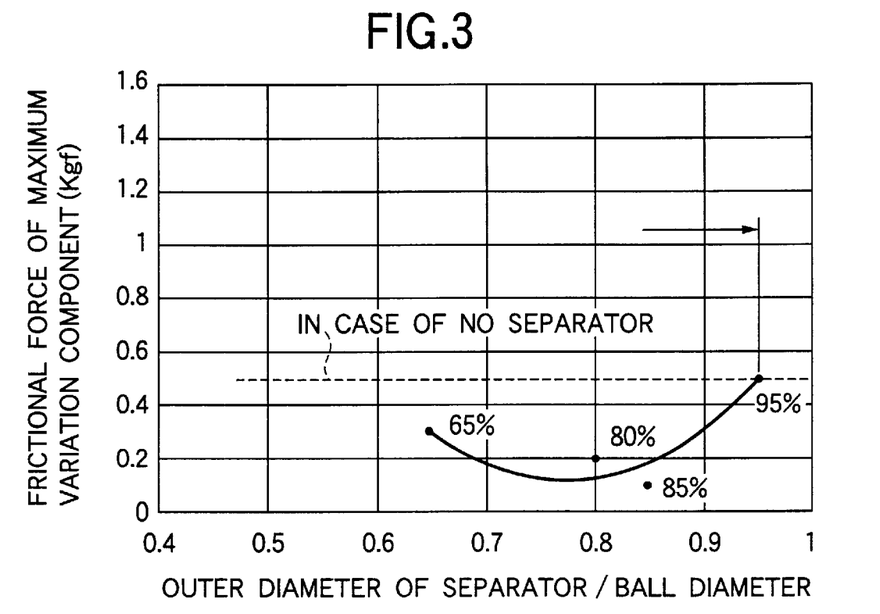
FIG. 3 is an explanatory view of evaluating the outside dimensions of the separators with respect to the ball diameter.

Then, in response to the radius of curvature of the inside guiding face 8b of the return guide 9, separators T of various outer diameters were used, and when ratios between the outside dimensions of those separators T and the diameters of the balls were 0.65 (65%), 0.80 (80%), 0.85 (85%) and 0.95 (95%), variations of dynamic friction of the separators T moving together with rolling of the balls in the ball circulating path 8 were measured for evaluating the operating performance by the outside dimensions L$\phi$d of the separators T. The measured results are shown in FIGS. 2 and 3. The dynamic friction of the standard linear guide bearing apparatus without furnishing the separator T is shown in FIG. 2E. In each of the shown graphs, the axis of abscissa is the moving distance (mm) of the separator T, and the axis of ordinate is the dynamic frictional force (kgf). Among variations in frictional force shown therein, taking sharp variations of the separators as shown in FIG. 2E into consideration, sizes of maximum variation components per each of the separators are compared in FIG. 3. Since the size of the maximum variation component of the standard without the separator is around 0.5 kgf (shown with the dotted line in FIG. 3), if a condition when using the separator is 0.5 kgf or lower, the outside dimension L$\phi$d of the separator T is preferably less than 0.95 (95%).

As mentioned above, the linear guide bearing apparatus of the first embodiment employs the separator T having the outer diameter L$\phi$d which is more than L$\phi$ being the outer diameter of the separator T under the condition where the ball K rolls while simultaneously contacting with both inside and outside curved faces 8a, 8b in the ball circulating path 8, that is, under the condition which is designed such that the playing of the ball K is zero in the ball circulating path 8 (or if needed, chamfering the end face of the slider main body continuing to the inside curve 8b of the ball circulating path 8), and the instant linear guide bearing apparatus is composed in such a size that the radius of curvature of the inside curve 8b in the ball circulating path 8 is reduced to a size not contacting the separator T, otherwise, in such a size that the radius of curvature of the outside curve 8a in the curved circulating path is expanded so that the inside curve and the separator do not contact. Thereby, the interference between the ball circulating path 8 and the separator T is prevented, and in comparison with the linear guide bearing apparatus having the return guide of the standard size, the instant embodiment obtains an effect of more improving the operating performance and noise characteristics.

Figure 4:
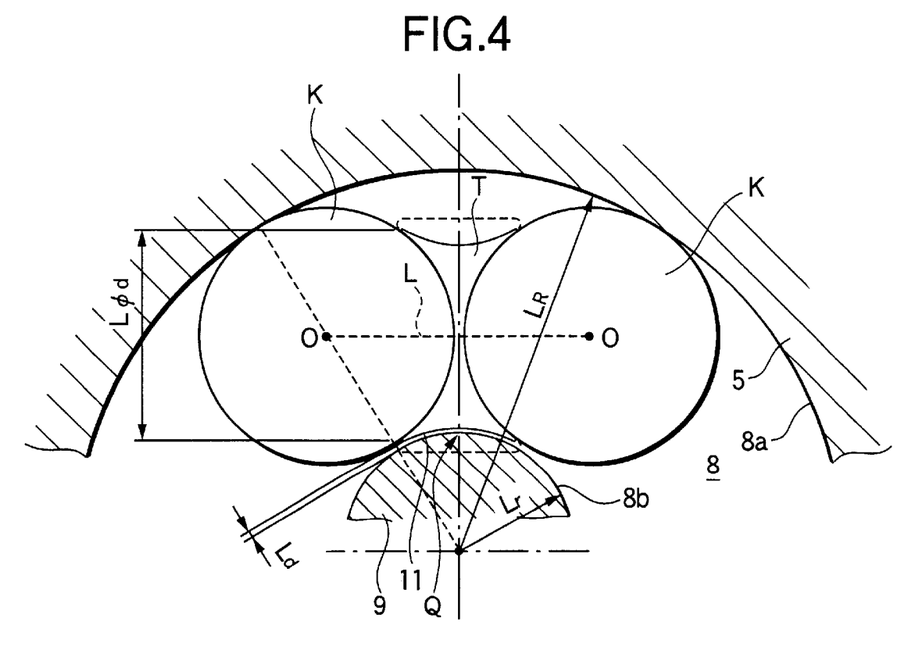
FIG. 4 is a cross sectional view of the curved raceway part showing the second embodiment of the linear guiding apparatus of the invention.

FIG. 4 shows a second embodiment of the linear guide bearing apparatus according to the invention.

This embodiment is different from the first embodiment in that a concave 11 is defined in an outer circumferential part Q of the separator T, following the inside guide face 8b of the ball circulating path 8. Therefore, in spite of the outer diameter of the same size as the separator T of the first embodiment, that is, the area of a concave contacting with the ball being the same size as in the first embodiment where the outer circumference Q is simple as a cylindrical face, the playing amount Ld can be made smaller, to thereby bring about an advantage of accomplishing lower noises.

Figure 5:
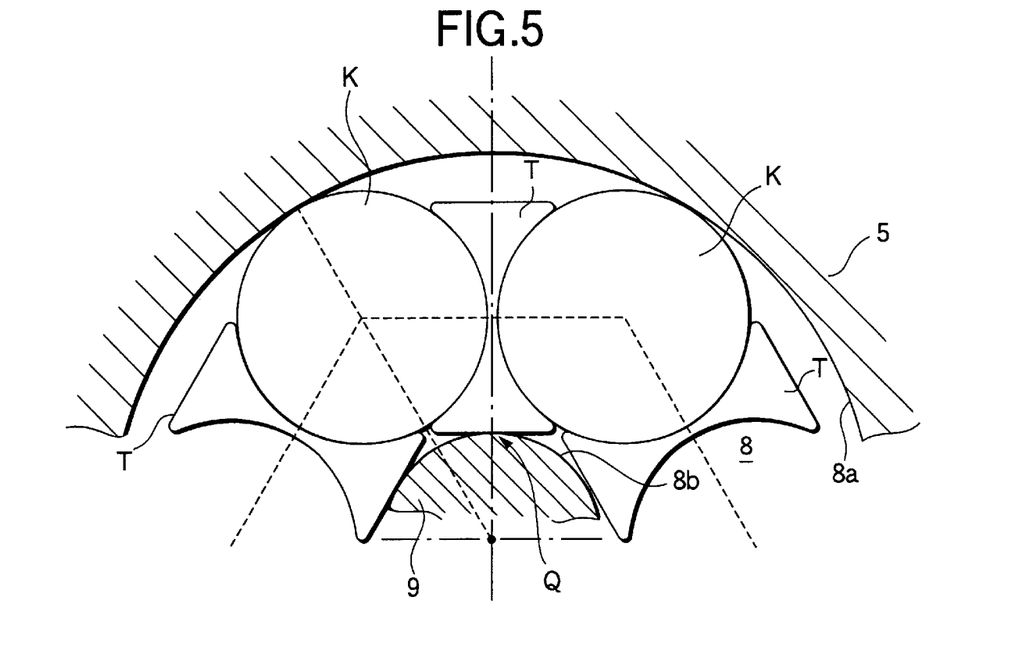
FIG. 5 is a cross sectional view of the curved raceway part showing the third embodiment of the linear guiding apparatus of the invention.

FIG. 5 shows a third embodiment of the linear guide bearing apparatus according to the invention.

According to this embodiment, the outer circumference Q of the separator T is slidably contacted with the inside guiding face 8b in the ball circulating path 8. This embodiment aims at more heightening the operating performance and noise characteristics by suppressing the zigzag phenomena of the ball K to the most.

Figure 6:
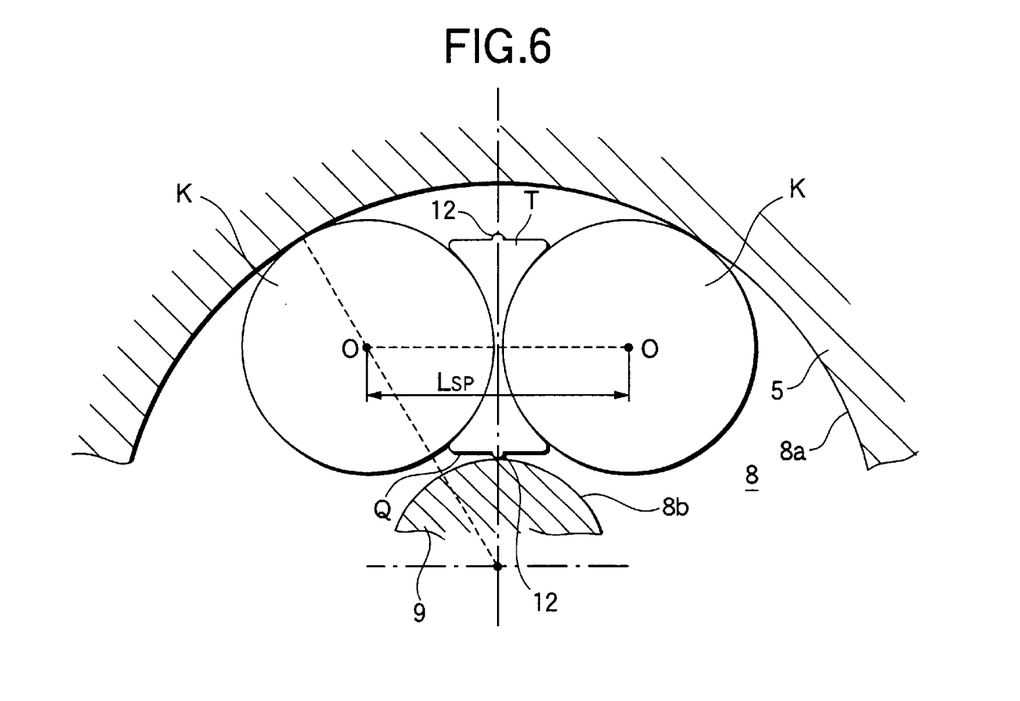
FIG. 6 is a cross sectional view of the curved raceway part showing the fourth embodiment of the linear guiding apparatus of the invention.

FIG. 6 shows a fourth embodiment of the linear guide bearing apparatus according to the invention.

This embodiment is different from each of the above mentioned embodiments in that a small projection 12 is provided on the outer circumference Q of the separator T, and via this small projection 12, the separator T contacts with the inside guiding face 8b of the ball circulating path 8. The contacting area between the separator T and the inside guiding face 8b is made small so as to reduce the frictional force to the most for further heightening the operating performance and noise characteristics.

Herein, a description will be given of the thickness of the separator T regulating the span between the balls K and K. From the viewpoint of load capacity of the linear guide bearing apparatus, the smaller the thickness of the separator T, the more preferable, but taking elastic deformation or formability of the separator T into consideration, it is reasonable that the thickness of the separator is determined to be around 3 to 10% of the ball diameter. In particular, when the ball is acted with large load, or loaded with large pre-load, the thickness of the separator T should be set as large as possible for increasing strength. But the ball span L$_{SP}$ is lengthened whereby and the outer diameter L$\phi$dmax of the separator is made small so that the ball holding forth of the separator T is lowered, and bad influences are probably affected to the operating performance and noise characteristic. Even in such cases, if applying the invention, the ball holding force of the separator may be increased and it is possible to prevent bad influences to the operating performance and noise characteristic.

In the above mentioned each of embodiments, an explanation has been made to not only the shape of the inside guiding face 8b but also the half toroidal shape where the entire shape of the ball circulating path 8 is single arc, but the ball circulating path 8 applied with the invention is not limited to such shapes. For example, a shape combined with an elliptic shape and plural arcs, or coupled with an arc shape and a straight shape may be enough for the ball circulating path 8.

Shown is that the outer diameter of the separator T is shaped substantially in a solid cylinder, and a hollow cylindrical shape having a penetrating hole at the center may be useful.

Explanation has been made to only independent separators T, but respective separators may be connected.

The cases where the linear guide bearing apparatus is applied to the linear guide apparatus are shown, but the invention may be suitably employed to other linear guide bearing apparatus such as linear ball bearings having the curved circulating paths.

As mentioned above, according to the invention, the outer diameter of the separator is made as large as possible, and concurrently the interference between the curved circulating path and the separator is limited to the minimum, thereby to assume the effects of enabling to more improve the operating performance and noise characteristics than the linear guide bearing apparatus of the standard specification without furnishing the separator.

What is claimed is:

1. A linear guide bearing apparatus, comprising:
   a guide member having a curved circulating path defined by inside and outside curved faces, wherein the guide member has a substantially single circular arc shape;
   a plurality of balls moving along the curved circulating path of the guide member; and
   a separator interposed between the adjacent balls such that an axial line of the separator is parallel to or coincides to a straight line combining center points of the adjacent balls, the separator defining concave faces at both ends thereof in the axial direction respectively at least partially contacting spherical surfaces of the adjacent balls,
   wherein an outer diameter of the separator is such that an end of the separator closer to the inner curved face extends towards the inner curved face farther from the outer curved face than a point on the radial line of the separator, said radial line being perpendicular to the axial line and passing through a center of the separator, said point being at a distance from the outer curved face equal to a diameter of the balls, and a radius of curvature of the inside curved face is reduced to such a size not as to contact with the separator, and/or a radius of curvature of the outside curved face is enlarged to such a size that the inside curved face does not contact with the separator.

2. A linear guide bearing apparatus, comprising:

a guide member having a curved circulating path defined by inside and outside curved faces;

a plurality of balls moving along the curved circulating path of the guide member; and a separator interposed between the adjacent balls such that an axial line of the separator is parallel to or coincides to a straight line combining center points of the adjacent balls, the separator defining concave faces at both ends thereof in the axial direction respectively at least partially contacting spherical surfaces of the adjacent balls, wherein an outer diameter of the separator is such that an end of the separator closer to the inner curved face extends towards the inner curved face farther from the outer curved face than a point on the radial line of the separator, said radial line being perpendicular to the axial line and passing through a center of the separator, said point being at a distance from the outer curved face equal to a diameter of the ball and an outer diameter of the separator is less than 95% of the diameter of the ball.

* * * * *